United States Patent [19]

Sundar

[11] 4,323,540
[45] Apr. 6, 1982

[54] REDUCTION OF IRON PRECIPITATION IN URANIUM EXTRACTION PROCESS

[75] Inventor: Parameshwaran S. Sundar, Pittsburgh, Pa.

[73] Assignee: Westinghouse Electric Corp., Pittsburgh, Pa.

[21] Appl. No.: 114,467

[22] Filed: Jan. 23, 1980

[51] Int. Cl.³ .............................................. C01G 43/00
[52] U.S. Cl. ............................................ 423/10; 423/8
[58] Field of Search ........................................ 423/8–10

[56] References Cited

U.S. PATENT DOCUMENTS

| | | | |
|---|---|---|---|
| 2,849,277 | 8/1958 | Thomas | 423/8 |
| 2,958,573 | 11/1960 | Gustison et al. | 423/10 |
| 3,402,026 | 9/1968 | Goren | 423/9 |
| 3,711,591 | 1/1973 | Hurst et al. | 423/10 |
| 3,835,213 | 9/1974 | Ritcey et al. | 423/9 |
| 3,835,214 | 9/1974 | Hurst et al. | 423/10 |
| 3,966,872 | 6/1976 | Sundar et al. | 423/9 |
| 3,980,750 | 9/1976 | Cousinon et al. | 423/9 |
| 4,105,741 | 8/1978 | Wicwiorowski et al. | 423/10 |
| 4,241,027 | 12/1980 | Bowerman et al. | 423/8 |

FOREIGN PATENT DOCUMENTS 10394  4/1980  European Pat. Off. .............. 423/10

*Primary Examiner*—Edward A. Miller
*Attorney, Agent, or Firm*—R. D. Fuerle

[57] ABSTRACT

The precipitation of an iron complex is reduced during the stripping of uranium with ferrous ion, where the uranium was oxidized with nitric acid then extracted with an organic solvent. The reduction is accomplished by pre-stripping with sufficient ferrous ion to reduce nitrates and nitrites formed during the nitric acid oxidation. The amount of ferrous ion used in pre-stripping, however, is insufficient to precipitate uranium.

10 Claims, 1 Drawing Figure

U.S. Patent
Apr. 6, 1982
4,323,540
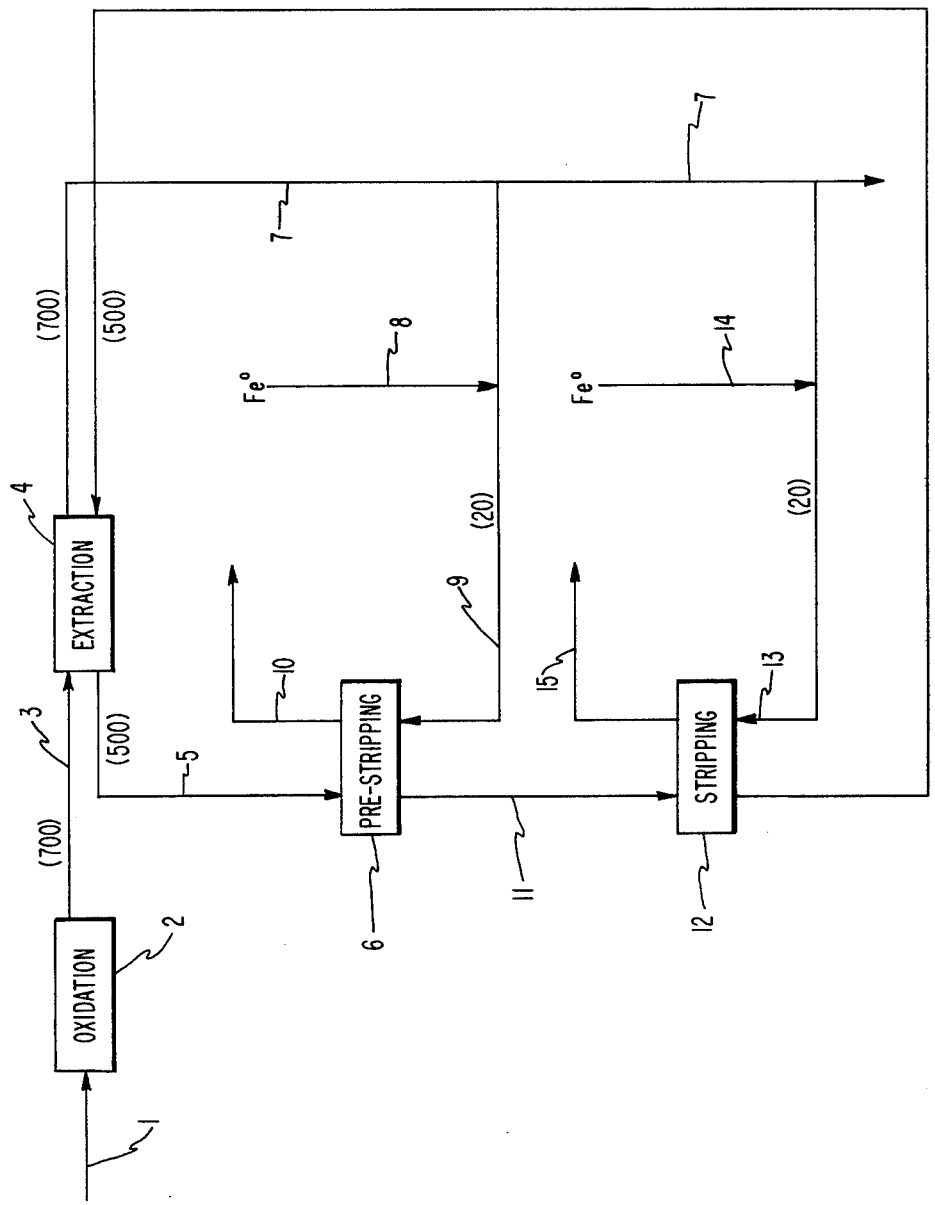

REDUCTION OF IRON PRECIPITATION IN URANIUM EXTRACTION PROCESS

BACKGROUND OF THE INVENTION

Phosphate rock, which is mined for use in making fertilizer, often contains recoverable quantities of uranium. The phosphate rock is digested with sulfuric acid to form a phosphoric acid liquor. The uranium is oxidized to the +6 oxidation state and is extracted into an organic solvent.

If nitric acid is used as an oxidant, however, nitrates and nitrites are formed which enter the organic solvent with the uranium. If the uranium is stripped from the organic solvent with an aqueous solution containing ferrous ions, some of the ferrous ions will be used up reducing the nitrates and nitrites. This means that a higher concentration of ferrous ion is required to strip the uranium. At the resulting higher concentrations of ferric ion an iron complex, $FeRH_8(PO_4)_6$, can precipitate which fills the stripper and must be periodically removed. (In the iron complex R is usually potassium, but may also be another alkali metal or ammonium.)

PRIOR ART

U.S. Pat. No. 3,980,750 discloses extracting uranium from nitric acid solutions. Hydrazine, phenylhydrazine, and sulphamic acid are disclosed as suitable agents for removing nitrites.

U.S. Pat. No. 3,835,213 discloses removing small amounts of iron by scrubbing with a dilute nitric acid solution in connection with the extraction of uranium.

U.S. Pat. No. 2,849,277 recognizes that ferrous ion is oxidized in a nitric acid solution in connection with the extraction of plutonium.

U.S. Pat. No. 3,835,214 discloses the use of ferrous ion in the recovery of uranium from a wet-process phosphoric acid solution.

SUMMARY OF THE INVENTION

We have discovered that the precipitation of iron in a uranium extraction process can be reduced or eliminated by pre-stripping the uranium loaded solvent of the nitrite and nitrate ions with sufficient ferrous ion to reduce any nitrate or nitrite ion to nitrogen oxide gases. Because the ferrous ion concentration in both the pre-stripping and stripping steps is lower, no iron precipitates and there is less iron contamination in the final uranium product.

DESCRIPTION OF THE INVENTION

The accompanying drawing is a block diagram illustrating a certain presently preferred embodiment of the process of this invention. The numbers in parentheses on the drawing indicate typical flow rates, and may be taken as gallons per minute or another other suitable unit.

In the drawing, phosphoric acid liquor in line 1 enters oxidation tank 2 where the +4 oxidation state uranium is oxidized to the +6 oxidation state required for extraction. If the oxidant is nitric acid (most commonly used), nitrous oxide gas, or a nitrate or a nitrite, then nitrate and nitrite ions are formed in the solution. These ions pass with the oxidized uranium in line 3 into extractor 4. In the extractor the aqueous phosphoric acid liquor is mixed with an organic solvent containing an extractant. Kerosene is the preferred organic solvent and the preferred extractant is di(2-ethylhexyl) phosphoric acid-trioctyl phosphine oxide (DEHPA-TOPA).

The uranium enters the organic phase along with the nitrate and nitrite ions and passes through line 5 into pre-stripper 6. The purpose of the pre-stripper is to reduce the nitrite ions before they reach the stripper so that a high concentration of ferrous ion is not needed in the stripper to reduce the uranium back to the +4 oxidation state. Thus, the concentration of ferrous ion in both the pre-stripper and the stripper is reduced so that precipitation of the ion complex does not occur or is much less than it otherwise would be.

The aqueous fluid used in pre-stripping is preferably a portion of the original phosphoric acid liquor from which the uranium has been extracted, though other aqueous fluids may also be used. To this fluid, in line 7, is added elemental iron, in line 8, which forms ferrous ion:

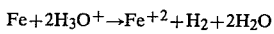

$$Fe + 2H_3O^+ \rightarrow Fe^{+2} + H_2 + 2H_2O$$

The aqueous fluid is then mixed with the organic solvent, preferably in a volume ratio of aqueous to organic of about 1 to 50 to about 1 to 10.

The ferrous ion reduces the nitrite ion in the pre-stripper to nitrous oxide.

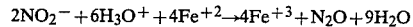

$$2NO_2^- + 6H_3O^+ + 4Fe^{+2} \rightarrow 4Fe^{+3} + N_2O + 9H_2O$$

The nitrous oxide is vented to the atmosphere.

Care must be taken to control the concentration of ferrous ion in the pre-stripper. If too much ferrous ion is present the uranium will be reduced from the +6 oxidation state to the +4 oxidation state and will enter the aqueous phase where it will be lost. If too little ferrous ion is present some nitrite ion will not be reduced, necessitating the use of additional ferrous ion in stripper which may result in the precipitation of the iron complex. It is believed that an appropriate concentration of ferrous ion in line 9 is about 5 to about 10 gms. per liter. The ferrous ion content in line 10 is preferably continuously measured chemically by titration to ensure that it is in the range of about 1.0 to about 2.0 gms. per liter.

Alternatively, or in addition to monitoring the ferrous ion concentration, it may also be desirable to check the redox potential and to keep it below 400 mV. Monitoring ferrous ion concentration is preferable to controlling the redox potential, however, because the redox potentail only corresponds to a minimum ferrous ion concentration, while monitoring gives both a minimum and a maximum ferrous ion concentration.

After pre-stripping, the aqueous fluid can be returned to the phosphoric acid liquir through line 10. The organic phase containing +6 state uranium goes through line 11 to stripper 12 where the uranium is reduced with ferrous ion to the +4 oxidation state, causing it to enter the aqueous phase. The aqueous phase in line 13 is preferably a portion of the extracted phosphoric acid liquor in line 7 to which elemental iron in line 14 has been added.

After stripping, the aqueous phase in line 15, which now contains the uranium, can be again extracted to further concentrate the uranium, which is eventually precipitated and collected, usually as an oxide.

It is preferable to exclude oxygen from both the pre-stripping and the stripping operation as oxygen will oxidize the ferrous ion necessitating greater concentrations of ferrous ion. This can be accomplished by blanketing the fluids with an inert gas such as carbon dioxide.

The detailed description has been limited to the pre-stripping step, as steps preceding and following it are well-known in the art. The following U.S. patents describe the extraction of uranium from phosphoric acid liquors and are herein incorporated by reference: U.S. Pat. Nos. 3,966,872; 3,711,591; 3,835,214; and 3,966,873.

The process of this invention is preferably performed as a continuous operation, as that is most efficient, though a batch process can also be used.

The following example further illustrates this invention.

EXAMPLE

A. Uranium Stripping Without Nitrite-Nitrate Prestrip

Continuous bench scale simulation tests were carried out with nitric acid oxidation, two stage counter-current extraction of uranium using 0.5 M D2EHPA-0.125 M TOPO-Kerosene solvent and two stage counter-current stripping of uranium using barren raffinate containing 23 g/l $Fe^{+2}$. A carbon dioxide blanket was used over the stripper stages to prevent air oxidation of the ferrous ions. Following flow rates were maintained during the tests:

Nitric acid dosage used for oxidation = 8.10 lbs/1000 gal
Feed acid flow rate to extractors = 75 ml/min
Solvent flow rate to extractors = 35 ml/min
Barren acid flow rate to strippers = 0.80 ml/min
Barren acid ferrous ion concentration = 23 g/l At near steady state conditions,
Uranium strip coefficient in the stripper Stage I = 4.3
Uranium strip coefficient in the stripper Stage II = 0.41

$$\text{uranium strip coefficient} \Delta \frac{\text{uranium concentration in acid}}{\text{uranium concentration in solvent}}$$

B. Uranium Stripping With Nitrite-Nitrate Prestrip

The same system in Part A was operated using a single stage nitrite-nitrate prestrip prior to the uranium operation. An inert argon blanket was used instead of the carbon-dioxide over the strippers. The following flow rates were used during the simulation test:

Nitric acid dosage used for oxidation = 7.46 lbs/1000 gal
Feed acid flow rate to extractors = 70 ml/min
Solvent flow rate to extractors = 37 ml/min
Barren acid flow rate to uranium strippers = 0.8 ml/min
Reduced acid flow rate to prestripper = 0.8 ml/min
Barren acid ferrous ion concentration = 25.6 g/l
Reduced acid ferrous ion concentration (to the pre-strip) = 24.3 g/l At near steady state conditions:
Uranium strip coefficient in stripper Stage I = 30.0
Uranium strip coefficient in the stripper Stage II = 22.0

This example shows that effective stripping of the uranium was not achieved in Example A whereas effective stripping was achieved in Example B where a pre-strip was used.

Effective stripping was also achieved without the pre-strip by increasing the ferrous ion content of the reduced acid to 35 grams per liter. However, considerable precipitate was formed which filled the settler and plugged the lines. Very little precipitate was formed in the example A or B systems.

What we claim is:

1. In a process for recovering uranium from a phosphoric acid liquor wherein uranium is oxidized from the +4 oxidation state to the +6 oxidation state with nitrate or nitrite ions and the +6 oxidation state uranium is extracted into an organic solvent and is then stripped from the organic solvent with an aqueous phosphoric acid solution containing $Fe^{+2}$ ions, the improvement which comprises reducing or eliminating the precipitation of iron when said uranium is stripped by pre-stripping with an aqueous phosphoric acid solution containing sufficient $Fe^{+2}$ ions to reduce nitrite and nitrate ions to nitrogen oxide gases but insufficient $Fe^{+2}$ ions to precipitate uranium.

2. A process according to claim 1 wherein the concentration of $Fe^{+2}$ used in said pre-strip is about 5 to about 10 gms/l.

3. A process according to claim 2 wherein the concentration of $Fe^{+2}$ leaving said pre-strip is about 1 to about 2 gms/l.

4. A process according to claim 1 wherein said pre-stripping is performed in the absence of air.

5. A process according to claim 4 wherein air is excluded with carbon dioxide.

6. A process according to claim 1 wherein the redox potential during said pre-stripping is maintained at less than 400 mV.

7. A process according to claim 1 wherein said uranium is oxidized with nitric acid.

8. A process according to claim 1 wherein the ratio of said aqueous phosphoric acid solution to said organic solvent in said pre-strip is about 1 to 50 to about 1 to 10.

9. A process according to claim 1 wherein said organic solvent is kerosene, said kerosene containing an extractant of diethylhexylphosphoric acid and trioctylphosphine oxide.

10. A process according to claim 1 wherein a portion of said phosphoric acid liquor is used as said aqueous phosphoric acid solution in stripping and pre-stripping.

* * * * *